Jan. 17, 1933.   A. E. OLSON   1,894,493
CORN TIPPER AND BUTTER
Filed April 9, 1930

Inventor
A. E. Olson.
By Lacey & Lacey, Attorneys

Patented Jan. 17, 1933

1,894,493

UNITED STATES PATENT OFFICE

ARTHUR E. OLSON, OF CLARKS, NEBRASKA

CORN TIPPER AND BUTTER

Application filed April 9, 1930. Serial No. 442,918.

This invention relates to a corn sheller and more particularly to a device by means of which kernels may be removed from the tip or butt of an ear of corn.

The kernels at the tip and butt of an ear of corn are not suitable for use as seed corn due to the fact that they are small and usually not properly developed. Therefore, when shelling corn for seed purposes, the kernels at the tip and butt ends of the ear are first removed so that when the ear of corn is passed through a shelling machine all of the kernels delivered by the sheller will be of the proper size and development.

The kernels upon the tip and butt ends of the ears of corn are at the present time usually removed by hand but it has been found that this practice quickly causes the hands to become sore and even if gloves are worn the hands will become sore due to grasping the ends of the ears and removing the kernels by a twisting motion.

Therefore, one object of the invention is to provide a device which may be easily held in one hand and is of such construction that the tip or butt end of an ear of corn may be thrust into the device and kernels removed by a twisting motion without causing the hands to become sore.

Another object of the invention is to so form the shelling device that, when an end of an ear of corn is thrust between walls of the device, the walls will conform substantially to the taper of an end portion of an ear of corn and thereby allow teeth projecting from the walls to very effectively engage small kernels and remove the same when the ear of corn is turned.

Another object of the invention is to provide the device with teeth so shaped that they are not only sharp at their ends but also provided with sharp edges along their sides and thereby prevent the teeth from slipping across kernels without detaching them when the ear is rotated.

Another object of the invention is to provide a corn butter and tipper adapted to be easily held in one hand and which is very simple in its construction and cheap to produce.

The invention is illustrated in the accompanying drawing, wherein

Figure 1:
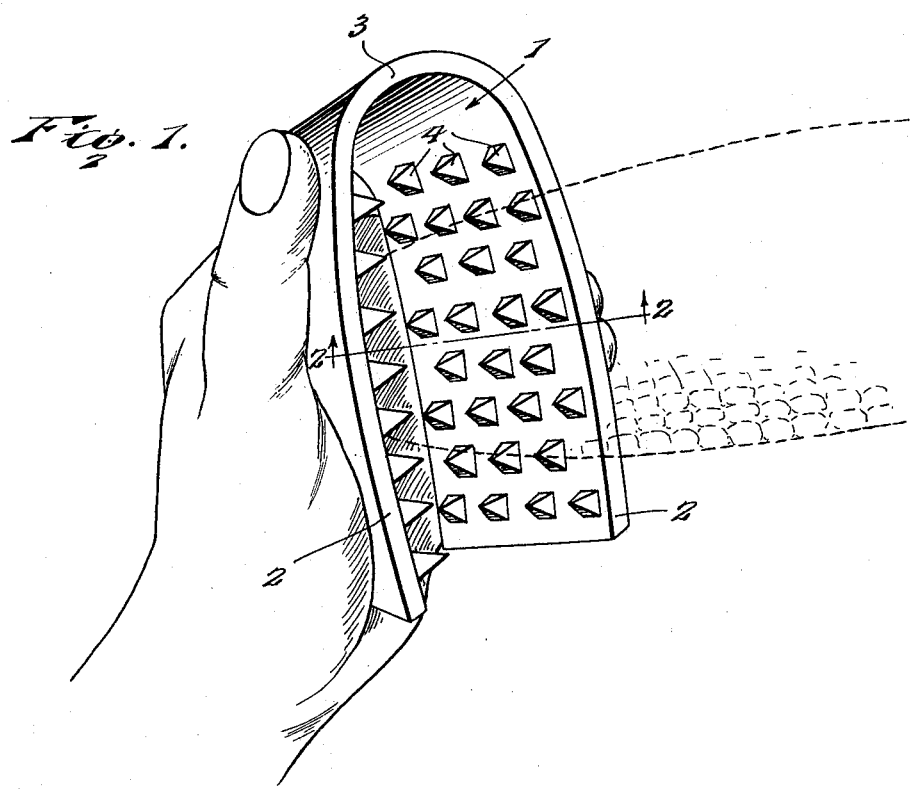
Figure 1 is a perspective view showing the corn tipper and butter in use.

This improved corn tipper and butter is preferably formed of metal, although other materials found suitable may be used and in the present illustration consists of cast metal. The body portion 1 is substantially U-shaped and has side walls 2 which are united at one end by a curved bridge portion 3. The other ends of the side walls are free and, therefore, the body is open at its front and rear and at one end. The walls and bridge are of sufficient thickness to impart rigidity and it is preferred that the body be formed of aluminum or some other metal of light weight so that the device may be easily held in one hand. By referring to the drawing it will be seen that the walls and bridge are relatively deep and converge towards the open rear end of the body. This not only permits the body to be easily grasped between the thumb and fingers of one hand, as shown in Figure 1, but also imparts a taper to the body so that when the tapered end of an ear of corn is thrust into the device teeth 4, which project from the inner faces of the side walls, will engage the tapered end of the ear of corn before the ear of corn has passed entirely through the body and firmly grip the kernels at the end of the ear. By this arrangement kernels may be removed from the butt or tip from either a large or a small ear of corn. It should also be noted that the prongs are arranged in rows upon the side walls and the prongs of each row disposed in staggered relation to the prongs of an adjacent row. Therefore, the prongs are very well distributed upon the side walls and when an ear of corn has one end portion thrust into the device and then twisted all of the kernels will be removed. Each of the prongs or teeth tapers to a point at its free end and has flat side faces converging outwardly. These faces intersect along the sides of the teeth thereby forming sharp side edges which serve to cause the teeth to firmly grip the kernels and quickly remove them when the ear is turned after having an end thrust into the device.

Figure 2:
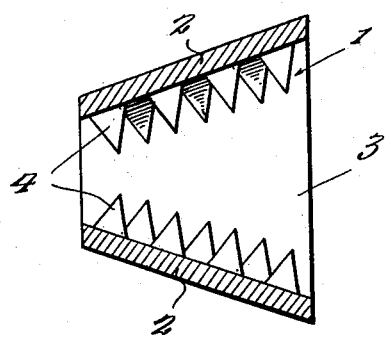
Figure 2 is a transverse sectional view through the device taken on the line 2—2 of Figure 1.

When this improved corn tipper and butter is in use, it is held in one hand with the thumb and fingers bearing against the outer faces of the side walls or the thumb and fingers may be engaged over the edges of the walls at the front of the device. The hand is held in approximately the position shown in Figure 1 so that it extends at a downward incline towards the spaced free ends of the walls. An ear of corn is held in the other hand and either the tip or butt end of the ear thrust into the device. As previously explained, the fact that the side walls converge as shown in Figure 2 limits the inward movement of the ear of corn between the side walls and causes a wedging action to take place. As soon as inward movement of the ear of corn is stopped by its engagement with the prongs, a twisting motion is imparted to the ear and also to the shelling device if so desired. This causes the teeth to have movement circumferentially of the ear and the kernels will be detached. These kernels drop into the hand holding the sheller and through the space between the free ends of the side walls. The kernels thus removed may be allowed to drop upon the ground or into a pan or other receptacle. Attention is called to the fact that inasmuch as the lower ends of the side walls 2 are spaced apart, an opening is formed at the bottom of the body through which kernels will fall by gravity into a receptacle adapted to receive the same, thus preventing the kernels from collecting within the body and clogging or otherwise interfering with the proper function of the teeth during the shelling operation. It will thus be seen that by use of this improved sheller kernels may be very easily and quickly removed from the tips and butt ends of ears of corn without injury to a person's hands. It will also be noted that the device is not only very effective in operation but also very simple in its construction and not liable to get out of order or easily break.

If so desired, the device may be formed of resilient metal, such as spring steel, thereby allowing the walls to be easily gripped and forced towards each other for tight gripping engagement with an end of an ear of corn.

Having thus described the invention, I claim:

A corn tipper and butter comprising an elongated body having an end wall and side walls extending from the end wall in transverse spaced relation to each other, the body being open at its front and the side walls being inclined transversely and converging rearwardly, and teeth projecting from the inner faces of the side walls for removing kernels from the end of an ear of corn when thrust into the body through its open front and rotated, the side walls at the lower end of the body being spaced apart to provide an opening at the bottom of said body through which kernels may drop by gravity during the shelling operation.

In testimony whereof I affix my signature.

ARTHUR E. OLSON. [L. S.]